M. M. MACDONALD.
PLAITING-MACHINE.
No. 193,169.    Patented July 17, 1877.
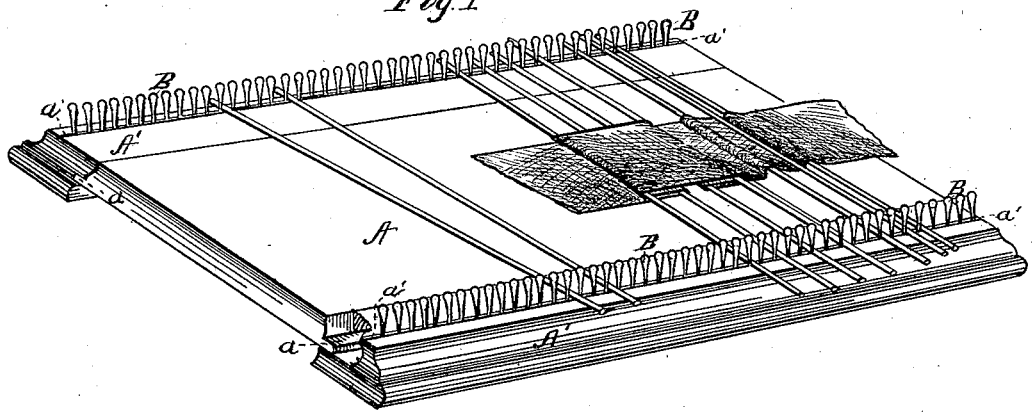
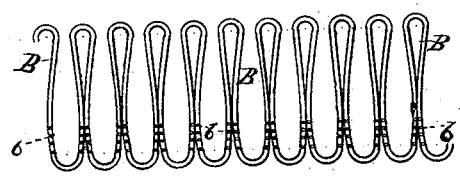
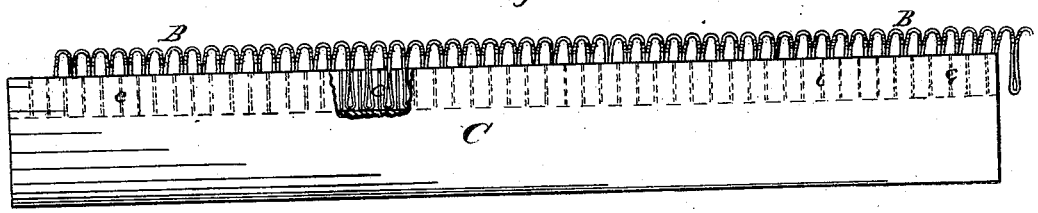
Witnesses
W. R. Edelen
H. H. Bliss
Inventor
Manville M. Macdonald
by H. H. Doubleday
atty

UNITED STATES PATENT OFFICE.

MANVILLE M. MACDONALD, OF SYRACUSE, NEW YORK.

IMPROVEMENT IN PLAITING-MACHINES.

Specification forming part of Letters Patent No. 193,169, dated July 17, 1877; application filed May 9, 1877.

*To all whom it may concern:*

Be it known that I, MANVILLE M. MACDONALD, of Syracuse, in the county of Onondaga and State of New York, have invented certain new and useful Improvements in Wire Teeth; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of my invention is to produce new and improved wire teeth for plaiting-machines or other articles, which can be readily and firmly secured in proper position in a narrow groove cut for their reception in a suitable support.

Figure 1 is a perspective view of a plaiting-machine having my improved teeth applied thereto. Fig. 2 shows the teeth or loops detached, and Fig. 3 represents an implement used in driving the teeth or loops into the bed-plate of the machine.

B B are the teeth. They are formed in a continuous series, from a single piece of wire, by means of any suitably-constructed wire-working machinery, which need not be specifically described in this patent.

After the wire has been bent into the proper shape the teeth are corrugated, barbed, notched, or otherwise roughened upon their sides near their lower ends, as at $b$—that is, the ends which are to be driven or placed in the supporting-groove. This barbing may, however, be done at any stage of manufacture, as shall be found convenient.

When these teeth or loops are to be used in a plaiting-machine, I construct the bed-piece A A', grooved, as at $a'$, in substantially the usual manner, and, for convenience and greater certainty in spacing, employ a driver. (Represented in Fig. 3.) This driver is made preferably of steel, and consists of a bar, C, of about the length of the series of loops to be driven. It is provided with mortises, recesses, or sockets, $c$, equal in depth to about two-thirds the length of each tooth, and spaced to correspond with the distance which is desired between the loops.

The teeth are inserted in the mortises when their barbed ends are driven into the groove by a blow on the back of the bar C.

I do not in this patent claim the bar or driver C, as I prefer to make that the subject of another application; nor do I wish to be limited to the use of these continuous barbed wire teeth in a plaiting-machine, as they are adapted for a variety of other uses.

What I claim is—

A series of barbed or otherwise roughened teeth or loops, B B, formed from a single piece of wire, substantially as set forth.

In testimony that I claim the foregoing as my own I affix my signature in presence of two witnesses.

MANVILLE M. MACDONALD.

Witnesses:
 C. G. ROBINSON,
 GEO. W. GRAY.